US007862253B2

(12) United States Patent
van den Berge et al.

(10) Patent No.: US 7,862,253 B2
(45) Date of Patent: Jan. 4, 2011

(54) WAVE PROTECTION STRUCTURE AND METHOD FOR PRODUCING A WAVE PROTECTION STRUCTURE

(75) Inventors: Arnoud van den Berge, Amsterdam (NL); Jan Sebastiaan Reedijk, Gouda (NL); Rolf Rainer Canto, Tamboerskloof (ZA)

(73) Assignee: Koninklijke Bam Groep NV, Bunnik (NL)

( * ) Notice: Subject to any disclaimer, the term of this patent is extended or adjusted under 35 U.S.C. 154(b) by 0 days.

(21) Appl. No.: 11/995,758

(22) PCT Filed: Jul. 13, 2006

(86) PCT No.: PCT/NL2006/000366

§ 371 (c)(1), (2), (4) Date: May 14, 2008

(87) PCT Pub. No.: WO2007/011208

PCT Pub. Date: Jan. 25, 2007

(65) Prior Publication Data

US 2008/0298894 A1     Dec. 4, 2008

(30) Foreign Application Priority Data

Jul. 15, 2005    (NL)   ................................... 1029538

(51) Int. Cl.
*E02B 3/12*    (2006.01)
*E02B 3/14*    (2006.01)

(52) U.S. Cl. .......................................... 405/33; 405/17

(58) Field of Classification Search .................... 405/15, 405/16, 17, 21, 23, 25, 30, 33, 34, 35
See application file for complete search history.

(56) References Cited

U.S. PATENT DOCUMENTS

| 1,678,613 | A | * | 7/1928 | Weiss | ......................... 264/247 |
| 3,252,287 | A | * | 5/1966 | Suzuki | ......................... 405/29 |
| 3,368,357 | A | * | 2/1968 | Takamori | ...................... 405/29 |
| 3,759,043 | A | | 9/1973 | Tokunaga | |
| 4,875,803 | A | | 10/1989 | Scales | |

FOREIGN PATENT DOCUMENTS

| CH | 290810 A | 5/1953 |
| DE | 4223335 A1 | 1/1993 |
| EP | 0016727 A | 10/1980 |
| WO | WO2004/009910 A2 * | 1/2004 |

* cited by examiner

*Primary Examiner*—Sunil Singh
(74) *Attorney, Agent, or Firm*—Hoffmann & Baron, LLP (57) ABSTRACT

A wave protection structure is intended for a slope, such as the slope of a breakwater or a bank, which slope merges into a bed at the location of a toe. The wave protection structure comprises wave protection elements and toe elements. The wave protection elements are each provided with a plurality of projections for engaging in one another and are provided on the slope in a substantially regular imaginary grid, with a horizontal grid spacing between the centers of gravity of the wave protection elements. The toe elements extend along the toe and their shape differs from the shape of the wave protection elements. The centers of gravity of the toe elements are provided at substantially the horizontal grid spacing from one another. As a result of the toe elements being provided at the grid spacing of the wave protection elements, it is easier to position the toe elements. This also allows the use of larger blocks and means that it is no longer necessary to stack the wave protection elements.

8 Claims, 5 Drawing Sheets

WAVE PROTECTION STRUCTURE AND METHOD FOR PRODUCING A WAVE PROTECTION STRUCTURE

CROSS-REFERENCE TO RELATED APPLICATIONS

This application is the National Stage of International Application No. PCT/NL2006/000366, filed Jul. 13, 2006, which claims the benefit of Netherlands Application No. NL 1029538, filed Jul. 15, 2005, the contents of which is incorporated by reference herein.

FIELD OF THE INVENTION

The invention relates to a wave protection structure for a slope, such as the slope of a breakwater or a bank.

BACKGROUND OF THE INVENTION

EP-A-1 540 087 discloses a wave protection structure for a slope, in this case a slope of a breakwater. At the location of a toe, the slope merges into a bed of, for example, a sea, ocean or harbour mouth. The wave protection structure is formed by wave protection elements of what are known as the interlock type. The wave protection elements which are known from EP-A-1 540 087 are provided with six projections. The projections of adjacent wave protection elements engage in one another, so that the wave protection elements together withstand the forces exerted on the individual wave protection elements by waves and current.

Wave protection elements of the known type are arranged against the slope in a more or less regular grid. Within the grid, the centres of gravity of the wave protection elements are at substantially the same horizontal grid spacing from one another. In practice, some variation in the horizontal grid spacing of individual wave protection elements is permitted without this being significantly detrimental to the overall cohesion of the wave protection structure. The individual variation with respect to the mean of the grid spacings is dependent on the type of wave protection elements and amounts to approximately 10% for the wave protection element from EP-A-1 540 087.

In practice, toe elements which are formed differently with respect to the wave protection elements are sometimes used along the toe of a wave protection structure. These toe elements ensure that the wave protection elements from the bottom row, i.e. the row which extends along the toe, under specific practical conditions remain sufficiently well in place and do not slide or tilt from the slope towards the bed. Toe elements of this type are formed, for example, from boulders, the weight of a boulder being less than the weight of a wave protection element. It is customary for the mean mass of a boulder to be ⅓ that of a wave protection element. Under extreme loads, the boulders may on average amount to 50% of the mass of the wave protection elements, in which case individual boulders, as a result of the spread in the size of the boulders, may have a mass of 60% of that of the wave protection element. The boulders are stacked on top of one another along the toe in the form of an underwater dam, in which case by way of example about seven boulders are provided in cross section. A first row of wave protection elements is provided against this underwater dam.

The known wave protection structure has the drawback that the boulders have to be positioned very carefully in order to construct a sufficiently stable underwater dam. Since work of this type in many cases takes place at a great depth and/or in cloudy water, the production of an underwater dam of this type is laborious and expensive. Another drawback is that in some cases there is only limited availability of boulders for forming an underwater dam of this type.

SUMMARY OF THE INVENTION

It is an object of the invention to at least partially overcome the abovementioned drawbacks, or at any rate to provide a usable alternative. In particular, it is an object of the invention to provide a wave protection structure in which the toe elements can be positioned more efficiently than in the prior art.

The invention provides a wave protection.

A wave protection structure is intended for a slope, such as the slope of a breakwater or a bank, which slope merges into a bed at the location of a toe. In addition to wave protection elements, the wave protection structure also comprises toe elements. The wave protection elements are each provided with a plurality of projections, which plurality of projections together form a three-dimensional structure for the wave protection elements to engage in one another in such a manner that the freedom of movement of the wave protection elements is limited in three dimensions. The wave protection elements are provided on the slope in a substantially regular imaginary grid, with a horizontal grid spacing between the centres of gravity of the wave protection elements. The toe elements extend along the toe in order to counteract displacement of the wave protection elements from the slope to the bed, and their shape deviates from the shape of the wave protection elements. The centres of gravity of the toe elements are provided at substantially the same horizontal grid spacing from one another as the wave protection elements.

As a result of the toe elements being provided at the grid spacing of the wave protection elements, the toe elements can be positioned more efficiently. This also allows the use of larger elements and means that it is no longer necessary to stack the toe elements.

It should be noted that EP-A1-0 016 727 discloses a slope protection for a river which comprises hexagonal elements and concrete blocks. The hexagonal elements have a plurality of projections and a through-opening. The hexagonal elements extend both along the slope and along substantially the entire bed of the river. The concrete blocks serve to anchor the hexagonal elements on the bed of the river and are located, inter alia, at the toe of the slope.

However, the hexagonal elements from EP-A1-0 016 727 have a flat, two-dimensional structure, with the plurality of projections extending in one plane. In other words, the hexagonal elements have a substantially identical cross section over their thickness. Consequently, the hexagonal elements are not suitable for protecting a slope which may be subject to substantial loading from waves. This is because waves can lift objects off a slope, in a direction which is substantially perpendicular to the slope. On account of the fact that the hexagonal elements all have projections in one plane, namely the plane running parallel to the slope, they do not offer any resistance to wave forces of this nature, unlike the wave protection elements according to the invention.

Moreover, EP-A1-0 016 727 does not disclose the concrete blocks, in the longitudinal direction of the toe, being provided at substantially the same horizontal grid spacing from one another as the hexagonal elements. FIG. 3 of the publication in question shows that the concrete blocks extend transversely to the toe direction and when seen in the longitudinal direction of the toe are only offset from one another by half the grid spacing.

The use in a river and the positioning of the concrete blocks indicate that the concrete blocks of EP-A1-0 016 727 serve to anchor the hexagonal elements against the forces of the flowing river water. The concrete blocks do not perform any function in terms of counteracting sliding or tilting of the hexagonal elements in the downward direction along the slope. This is because there are identical hexagonal elements which prevent this sliding on the bed of the river.

Advantageous embodiments of the invention are defined below.

In particular, an angle of tilt of at least one of the toe elements is greater than an angle of tilt of the wave protection element, the angle of tilt for each of the elements being defined by the angle between the direction of the force of gravity and an imaginary line from the centre of gravity to a tilting point of the element in question. As a result, a toe element will be less likely to roll away under horizontal loads than a wave protection element located at the same position.

In one embodiment, a restoring moment of at least one of the toe elements, which is exerted by the weight of this toe element with respect to a tilting point if this toe element is subjected to a tilting moment, is greater than a restoring moment of a wave protection element if it were to be subjected to the same tilting moment at a comparable position along the toe. Consequently, the toe element is in a more stable position than if a wave protection element were to be located at the same position along the toe. The greater restoring moment reduces the movements of the toe element under horizontal loads and therefore the risk of it sliding and/or rolling away.

In one particular embodiment, the centre of gravity of at least one of the toe elements is lower than half the height of the toe element in question. Shaping the toe element in such a way that the centre of gravity is lower than half the height increases the angle of tilt.

In an advantageous embodiment, at least one of the toe elements is provided with a supporting surface, by way of which it rests on the bed. A supporting surface of this type reduces the risk of the toe element sliding away under horizontal forces.

In one embodiment, the shape of at least one of the toe elements is substantially identical to the shape of the wave protection element from which at least one projection has been omitted to form a supporting surface. A toe element of this type is relatively easy to produce by adapting a mould for the wave protection elements. Moreover, a toe element of this type will expediently be able to interact with the projections of the wave protection elements.

In one embodiment, the wave protection structure comprises crown elements, the shape of at least one of the crown elements being substantially identical to the shape of the wave protection element from which at least one projection has been omitted. This has the advantage over the prior art that an improved connection of the wave protection structure to another structure can be achieved in the vicinity of the crown.

The invention also relates to a method for producing a wave protection structure. Advantageous embodiments are defined herein.

BRIEF DESCRIPTION OF THE DRAWINGS

The invention is explained in more detail by means of various exemplary embodiments which are shown in the accompanying figures, wherein.

DETAILED DESCRIPTION OF PREFERRED EMBODIMENTS

Figure 1:
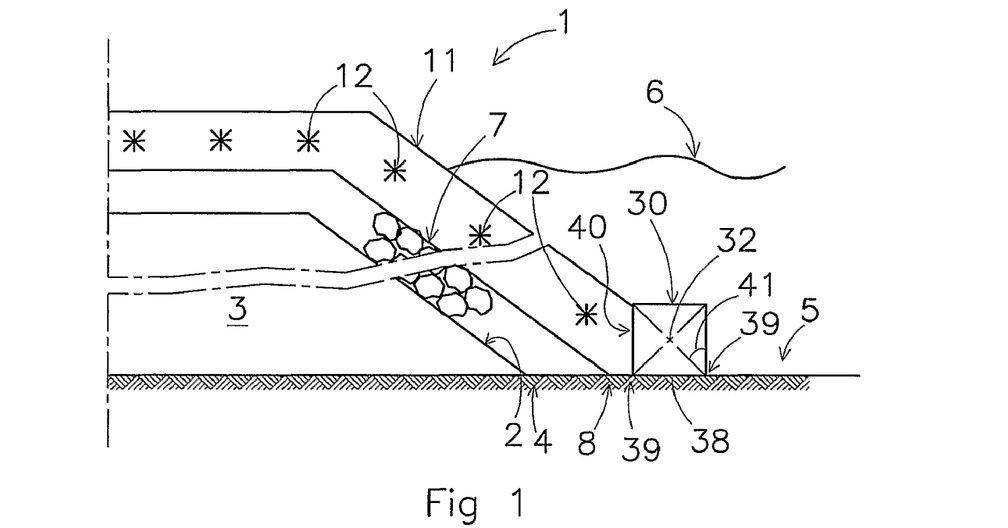
FIG. 1 shows a side view of a diagrammatic example of a wave protection structure.

FIG. 1 shows a wave protection structure according to the invention, which is denoted overall by reference numeral 1. The wave protection structure 1 is intended to protect a slope 2, in this case the slope 2 of a breakwater 3. At the location of a toe 4, the slope 2 merges into a bed 5 of a body of water. The bed 5 is located under water, the mean water level being indicated at 6.

In this example, a filter layer 7 is provided on the slope 2. At the location of a toe 8, the filter layer merges into the bed 5. It should be noted that the term "toe" can be related to the unprotected slope of a bank, dyke or breakwater, as indicated above as toe 4. However, the term "toe" may also be based on the filter layer 7 or alternatively the outermost layer of wave protection elements. However, for the purposes of understanding the invention, it is primarily the direction of the toe which is important, and in the case of the toes in accordance with the definitions given above, they run substantially parallel.

The filter layer 7 in this case comprises a layer composed of rocks of different dimensions and here serves as a base for a single layer 11 of wave protection elements. The wave protection elements are only diagrammatically indicated in FIG. 1, for the sake of clarity, by means of two lines which represent the boundary of the associated layer 11 of wave protection elements. In addition, the centres of gravity 12 of the wave protection elements are diagrammatically indicated by means of small x symbols.

The wave protection elements are of what is known as the interlocking type, two exemplary embodiments of which are shown below in FIGS. 3 and 4. Wave protection elements of this type comprise a plurality of projections, usually four or six. The plurality of projections form a three-dimensional structure. In other words, the plurality of projections extend in a plurality of planes. This distinguishes the wave protection elements from two-dimensional bank protection elements, which have a substantially identical cross section over their entire thickness. The projections of a first wave protection element fit into spaces between the projections of one or more adjacent wave protection elements, thereby forming a connection. On account of the three-dimensional structure which is formed by the projections, the freedom of movement of the wave protection elements is limited in three dimensions. Therefore, the wave protection elements are not only fixed in the plane of the slope but are also held together by adjacent wave protection elements so as to withstand the forces of waves seeking to lift the wave protection elements out of the plane of the slope. Moreover, the three-dimensional structure achieves greater dissipation of wave energy than flat wave protection elements. This means that wave protection elements with a three-dimensional structure are more suitable for conditions with greater wave heights, such as banks and breakwaters in large lakes, seas and oceans.

It should be noted that wave protection elements with a three-dimensional structure are also well known in practice under (registered) trade names such as Xbloc, Accropode, Accropode II, Ecopode, Core-loc, and A-Jack. These wave protection elements can be deemed to be composed of at least one base body which extends in a first plane and at least two projections which extend on either side of the base body. The base body may in this case also be provided with a plurality of projections which extend in the plane of the base body to form an H-shaped base body, as in the case of Accropode, Ecopode and Core-Lock, or to form a cross-shaped base body, as in the case of Xbloc and A-Jack.

Figure 2:
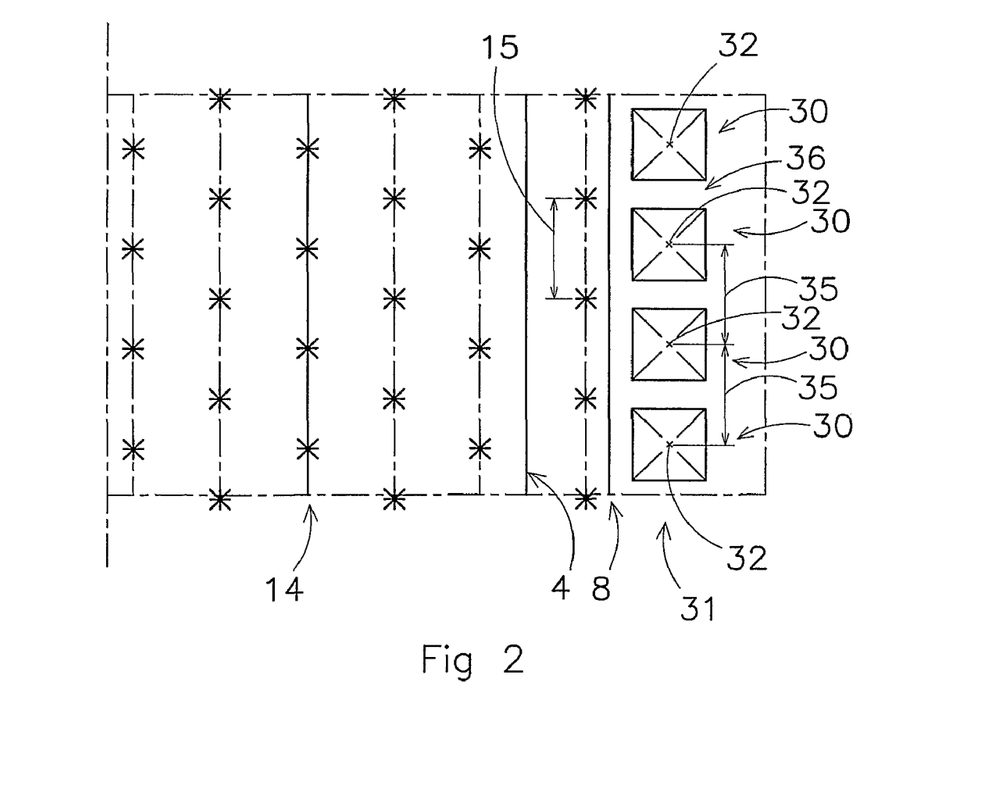
FIG. 2 shows a partial plan view of FIG. 1.

The wave protection elements are provided in a regular grid 14 (cf. FIG. 2). The centres of gravity 12 are in this case at a horizontal grid spacing 15. The horizontal grid spacing 15 is substantially identical for all the wave protection elements placed next to one another. However, it will be clear to a person skilled in the art that in practice the spacings 15 between the elements will not be precisely identical, on account of positioning inaccuracy and settlement. In practice, deviations of this type may amount to substantially 10% of the mean spacing. In the present context, the term substantially identical is to be understood as meaning a degree of correspondence which produces a grid of sufficient regularity for it to be possible to distinguish rows and columns of wave protection elements therein.

The wave protection structure 1 also comprises preshaped toe elements 30, disposed in a (single) row 31 along toe 4 or toe 8. Centres of gravity 32 of the toe elements 30 are at a horizontal spacing 35 from one another. The spacings 35 between the toe elements 30 are substantially identical to one another and are substantially identical to the spacing 15 of the wave protection elements. The comments which have been made above with regard to the occurrence of tolerances once again apply to the extent to which these spacings correspond.

The shape of the toe elements 30 deviates from the shape of the wave protection elements (not shown). In the exemplary embodiment shown in FIGS. 1 and 2, the toe element 30 is in the form of a cube and does not have any projections.

The edge of the cube, and in more general terms the length of the toe element 30, as seen in the direction of the toe 4, is shorter than the spacing 35 between the toe elements. Therefore, the toe elements 30 define through-flow openings 36. These through-flow openings 36 reduce the hydraulic loading on the toe elements 30 which occurs when waves flow over the layer 11 of wave protection elements, and in particular when the water in question is flowing back again downwards along the slope 2. In general, a toe structure with toe elements according to the invention has a porosity of substantially at least 30%, in particular at least 40% and preferably at least 50%.

Unlike in the case of an underwater dam as used in the prior art, the toe elements 30 are not stacked on top of one another and are disposed in a single row 31. The toe elements 30 each have a mass which is preferably at least 80% of that of a wave protection element of the wave protection structure. In a variant, the mass is substantially identical to that of the wave protection elements. The toe elements 30 are preformed, i.e. they are produced in a predetermined shape and are not formed more or less randomly, for example by blasting a mass of rock.

The wave protection elements 30 rest on the bed 5 by way of a supporting surface 38. The supporting surface 38 is preferably substantially flat, so as to create a large contact area with the bed 5, in order to increase the frictional forces between toe element 30 and bed 5. The surface area of supporting surface 38 is preferably also equal to the largest horizontal cross section through the toe element 30. This likewise increases the frictional force.

In addition, by virtue of the large cross section, the supporting surface 38 increases stability, i.e. increases the resistance to tilting of the toe element 30. The edges of the supporting surface 38 form tilting points 39. Water flowing back and/or the weight of the wave protection elements will be able to exert a horizontal force on the toe element 30, diagrammatically indicated by means of arrow 40. Under a horizontal force 40 of this type, the toe element 30 will tend to tilt about one of the tilting points 39. In the process, the weight of the toe element 30 will exert a restoring moment which is at most equal to the weight times the horizontal distance from the centre of gravity 32 to the associated tilting point 39.

Even if the horizontal force 40 exerts a tilting moment on the toe element 30 which is greater than the restoring moment of the toe element for a relatively short time, the toe element 30 will not immediately turn over. The stability of the toe element 30, i.e. its ability to tilt back into the original position after tilting has started, is in this case determined by an angle of tilt 41. The angle of tilt 41 is the angle between the vertical, i.e. the direction of the force of gravity, and a connecting line between the centre of gravity 32 and the tilting point 39. The greater this angle, the greater the stability of the toe element 30 will become.

Figure 3:
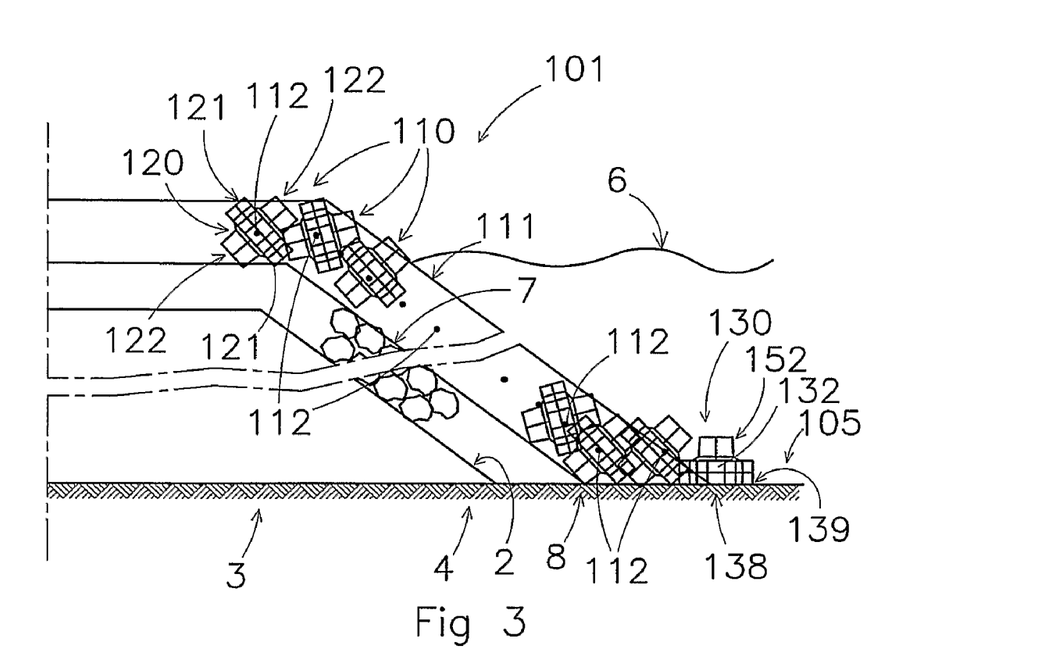
FIG. 3 shows a side view of a second exemplary embodiment.
Figure 4:
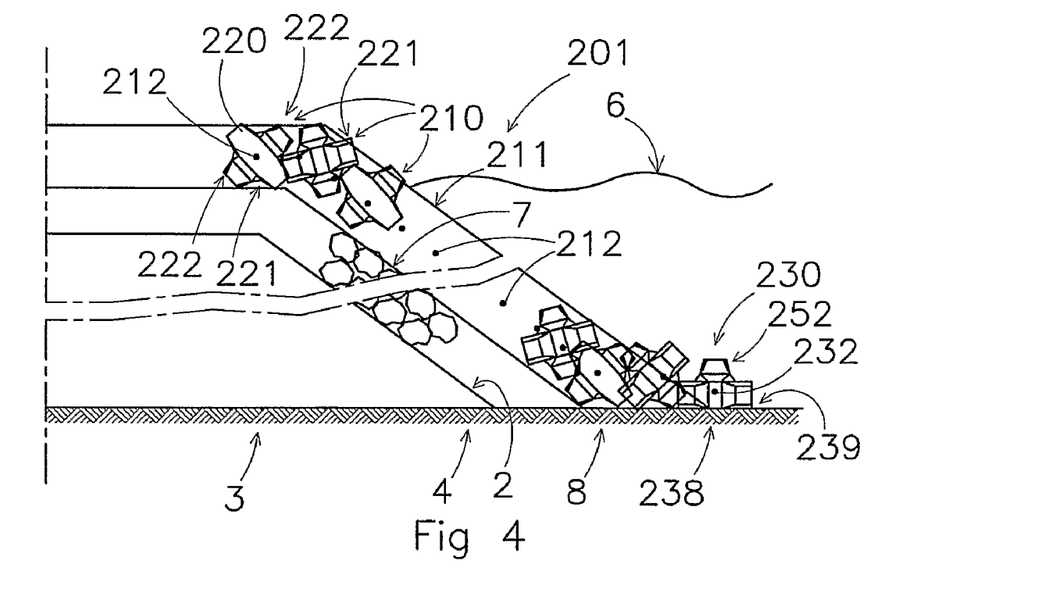
FIG. 4 shows a side view of a third exemplary embodiment.

FIGS. 3 and 4 show variants on the general principle of FIGS. 1 and 2. It should be noted that in FIG. 1 to 4, the bed 5 is a relatively hard bed, for example a rock bed. However, the invention can also be used on softer beds, such as for example a sand bed. In that case, the filter layer 7 will also extend a certain distance over the bed 5, such that it extends at least beneath the toe elements. Beneath the filter layer 7 there may also be other layers, composed of elements which are of smaller dimensions that those of the filter layer 7.

Similar components in FIGS. 3 and 4 are denoted by a reference numeral which has been increased by 100 or 200, respectively, compared to that used in FIGS. 1 and 2. A wave protection structure 101 comprises wave protection elements 110 which are provided in a single layer 111 on the slope against the filter layer 7. The wave protection elements 110 have centres of gravity 112; only the centre of gravity 112 of some of the wave protection elements 110 is shown, for the sake of clarity.

Here, the wave protection elements 110 are composed of a square base body 120 which at the corners is provided with four identical projections 121 which extend in the diagonal direction with respect to the square base body. Furthermore, the wave protection element 110 comprises two substantially cubic projections, also referred to as noses 122. The noses 122 extend perpendicular to the square base body 120 and the plane of the projections 121. A row of toe elements 130 extends along the toe 4. The horizontal spacing between the centres of gravity 132 of the toe elements 130 is substantially equal to the horizontal spacing (not shown) between the wave protection elements 110, as has been described in more detail above in connection with FIGS. 1 and 2.

Figure 5:
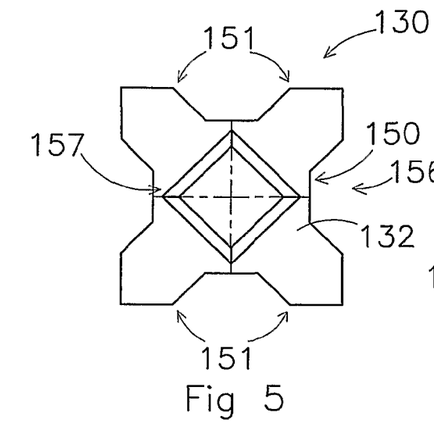
FIG. 5 shows a plan view of a toe element.
Figure 6:
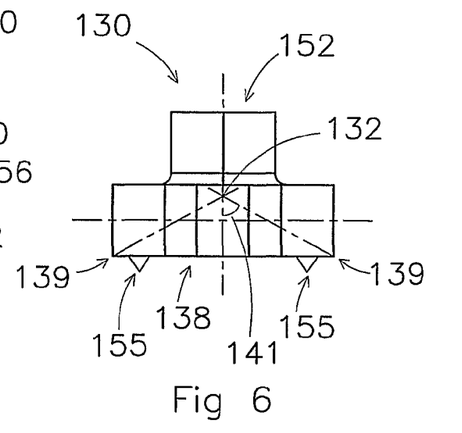
FIG. 6 shows a side view of the toe element from FIG. 5.

The toe element 130 is shown in more detail in FIGS. 5 and 6. It is supported on the bed 5 by way of a supporting surface 138 and has tilting points 139. The toe element 130, given comparable horizontal dimensions and the same weight, has a similar restoring moment to the cubic toe element 30. However, the toe element 130 has a greater angle of tilt 141. This is because the centre of gravity 132 of the toe element 130 is in relative terms at a lower level than that of the cubic toe element 30. The centre of gravity 132 is in this case lower than half the height of the toe element 130. As a result, the toe element 130 will have a greater stability than the cubic toe element 30.

The toe element 130 comprises a square base body 150. At each of the corners of the square base body 150, an identical projection 151 extends in diagonal directions with respect to the base body 150. The outermost boundaries of the projections 151 form the tilting points 139. Furthermore, a nose 152 extends upwards from the slab 150. The top side of the slab 150, i.e. the opposite side from the supporting surface 138, can be considered as a bearing surface for supporting wave protection elements 110 located nearby.

On the side of the supporting surface 138, the toe element 130 is optionally provided with friction-increasing means 155, in the form of relatively short projections, or steel pins or dowels. The friction-increasing means 155 are intended to engage in small openings or irregularities in a rocky bed. The projections 155 can also penetrate into a sandstone bed.

The toe element 130 differs in shape from the wave protection elements 110 by virtue of the omission of a second nose 122. The absence of a second nose forms the flat supporting surface 138. Advantageously, nose 152 and the projections 151 are, however, identical or at least similar to the projections 121 and 122 of the wave protection elements 120. This improves the engagement between the bottom row of wave protection elements 110 on the row of toe elements 130.

The nose 122 amounts to approximately 11% of the total mass of the wave protection element 110. Therefore, the mass of the toe element 130 will be approximately 89% of the mass of the wave protection element 110 if it otherwise has the same dimensions and is made from the same material. If desired, the mass of the toe element can be increased, for example by one or two of the depressions 156 between the projections 151 being filled with concrete. It is preferable to retain two adjacent depressions 156, i.e. two depressions 156 between which there is only one projection 151, in open form, in order to receive projections 221, 222 of wave protection elements 110.

The toe elements 130 which are adjacent to one another are advantageously rotated with respect to one another through an angle of substantially 45°. The outermost point of a projection 151 may in this case bear against the toe 4, so that the minimum horizontal distance from the centre of gravity 132 to the toe 4 is equal to half the root of two times the width of the toe element 130. A toe element is in this case located exclusively on the bed 5 and is not supported on the slope 2 or that part of the filter layer 7 which bears against the slope 2. The entire toe structure may also comprise a row of wave protection elements 110 which extends between the row of toe elements 130 and the wave protection elements 110 located against the slope 2.

An alternative toe element may be formed by, based on the shape of the wave protection element 110, omitting one projection 151, including the associated corner of the base 150, as is diagrammatically indicated by dashed line 157 in FIG. 5. The result is a supporting surface which is formed, inter alia, by sides of the two projections 152 and of the two projections 151 located opposite one another.

FIG. 4 differs from the embodiment shown in FIG. 3 by virtue of the fact that a wave protection structure 201 has been constructed using wave protection elements 210 which deviate from the wave protection elements 110. Toe elements 230 deviate in a corresponding way, as will become clearer from FIGS. 7 and 8. The wave protection elements 210 are likewise provided with projections, but in this case two anvil-shaped projections 221 which extend along a cubic core 220. Two noses 222 also extend from the cubic core 220.

Figures 7, 8:
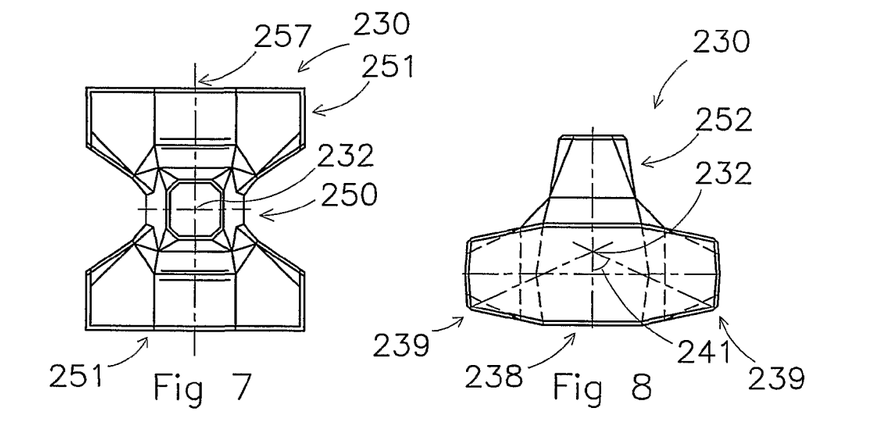
FIG. 7 shows a plan view of an alternative toe element.
FIG. 8 shows a side view of FIG. 7.

The toe elements 230 have centres of gravity 232, a supporting surface 238, tilting points 239 and two anvil-shaped projections 251 which extend along a core 250. Unlike the wave protection element 220, the toe element 230 is provided with only one nose 252.

In an advantageous production method, the toe element 230 is formed in the same mould as the wave protection element 210. However, a partition ensures that no setting material, such as concrete, can flow into the cavity intended for a projection 222. The same method can also be used for other toe elements, such as the toe element 130 discussed above.

The support surface 238 is curved. As a result, the restoring moment of the toe element 230 will in the first instance be relatively small, and the toe element 230 will be relatively unstable on a hard bed. At a larger angle of tilt, the toe element will start to tilt about tilting points 239. The tilting points 239 of the wave protection elements 210 are formed by the outermost edges of the projections 221 and 222. The tilting points 239 are located at the outermost edge of the supporting surface 238, so that an even greater restoring moment will be produced.

An angle of tilt 241 is defined as the angle between the force of gravity acting on the toe element 230 at the centre of gravity 232, and an imaginary line from the centre of gravity 232 to the tilting point 239. This angle of tilt is greater than that of a wave protection element 210 if the latter were to be provided in any orientation along the toe 4. The centre of gravity 212 of the wave protection element is higher than that of the toe element 230. However, if a wave protection element 210 rests on a substantially flat bed 205, the projections form an oblique angle with respect to the direction of the centre of gravity. As a result, the tilting points, as seen in the horizontal direction, are in relative terms closer to the centre of gravity and the angle of tilt is smaller than if the corresponding projections 221, 222 were to extend horizontally.

Figures 21, 23:
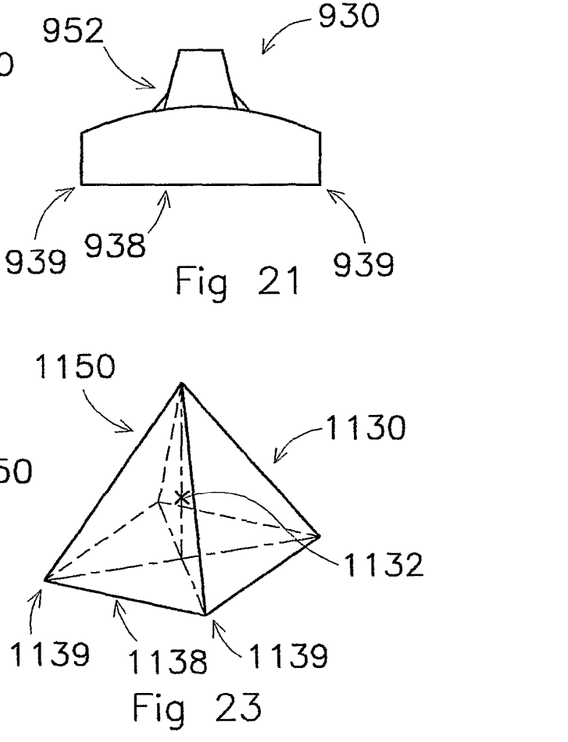
FIG. 21 shows a toe element, based on the toe element from FIG. 7.
FIG. 23 shows a pyramidal toe element.

The non-flat shape of the supporting surface 238 on the filter layer 7 or other deformable base can contribute to the resistance to sliding away. Designing the supporting surface 238 of the toe element 230 to be flat, by contrast, improves the stability and produces an embodiment as shown in FIG. 21.

An alternative toe element, based on the shape of the wave protection element 210, is formed by the omission of substantially half of the wave protection element 210. The section plane, and therefore in use the supporting surface, to be used is a plane which runs through or parallel to the axis of symmetry through the noses 222 and is substantially perpendicular to the longitudinal direction of the anvil-shaped projections 221. If FIG. 7 is considered as a view of the wave protection element 210, the plane in question would be indicated by means of dot-dashed line 257.

Figures 9, 11:
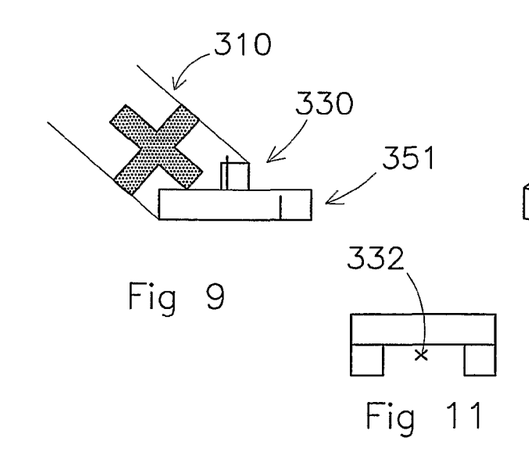
FIG. 9-11 show views of another alternative toe element.
Figure 10:
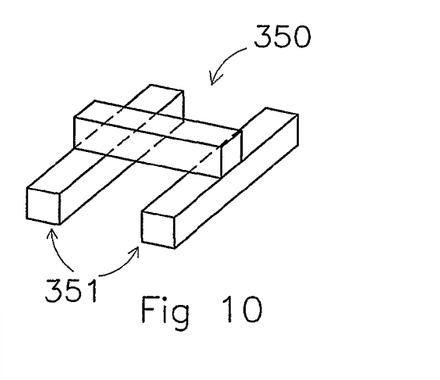

FIG. 9 diagrammatically depicts a wave protection element 310 with cross-shaped projections which is partially supported on a bearing surface of a toe element 330. The toe element 330 is H-shaped and comprises a base bar 350 and two elongate projections 351. The centre of gravity of the toe element 330 is located below half the height of the toe element 330.

Figures 12, 13:
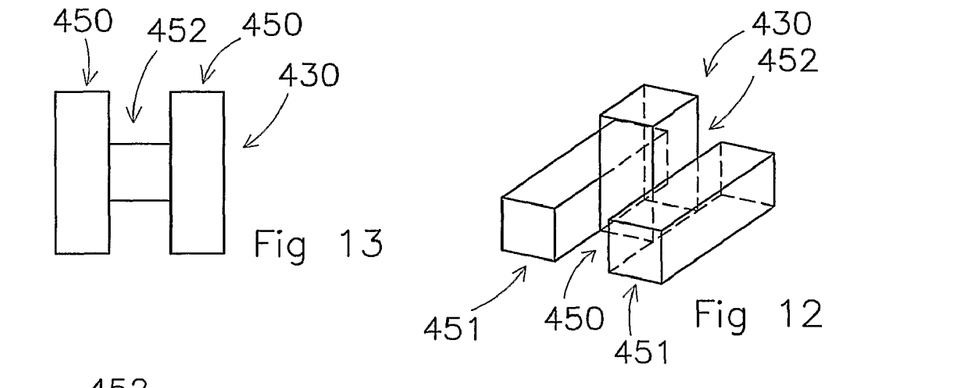
FIG. 12-14 show views of a further alternative toe element.
Figure 14:
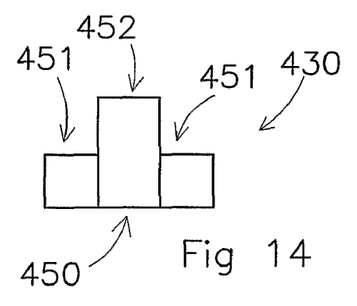

FIG. 12 shows a three-dimensional view of an alternative toe element 430 with a core 450 and two elongate projections 451 as well as a nose 452. FIGS. 13 and 14 show a plan view and a side view of the toe element 430.

Figure 15:
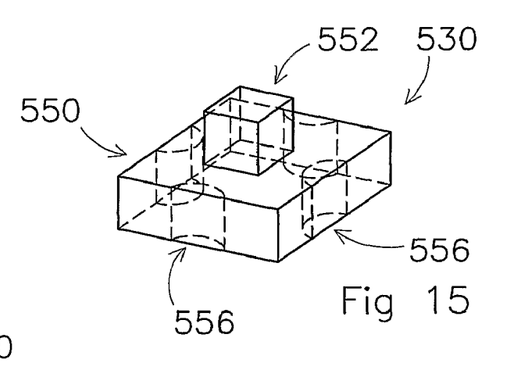
FIG. 15 shows a three-dimensional view of a toe element with a square base.

FIG. 15 shows a simplified embodiment of a toe element 530 with a square base slab 550. The square base slab 550 is provided with a cubic nose 552. The square base slab 550 may be provided with recesses 556, which can provide additional support to the projections of the wave protection elements (not shown).

Figure 16:
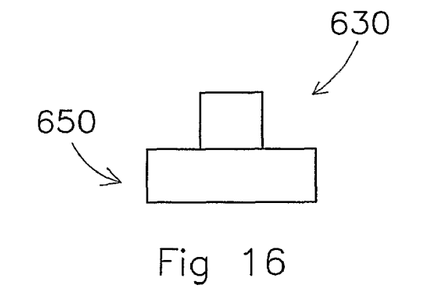
FIGS. 16 and 17 show views of a toe element with a circular base.
Figure 17:
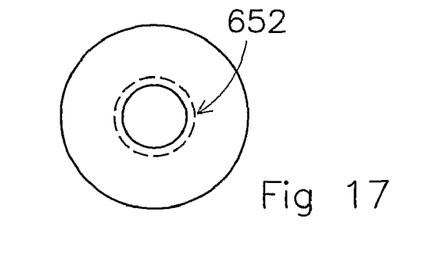

FIGS. 16 and 17 respectively show a side view and a plan view of a toe element 630 with a substantially circular baseplate 650. The circular baseplate 650 is provided with a likewise circular nose 652, the diameter of the nose 652 being smaller than that of the baseplate 650.

Figure 18:
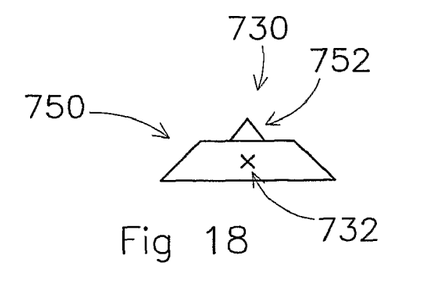
FIGS. 18 and 19 show views of a toe element with a bevelled square base.
Figure 19:
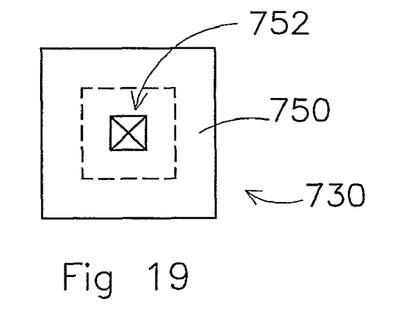

FIGS. 18 and 19 respectively show a side view and a plan view of a toe element 730 with a square base slab 750. The sides of the square base slab 750 are bevelled in order to lower the centre of gravity 732 compared to a base slab with straight sides. The nose 752 is of pyramidal design to achieve the same objective.

Figures 20, 22:
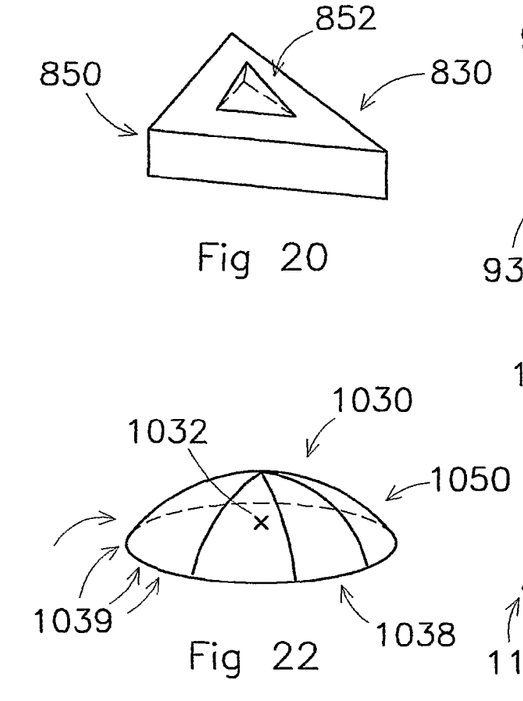
FIG. 20 shows a three-dimensional view of a toe element with a triangular base.
FIG. 22 shows a toe element in the form of a segment of a sphere.

FIG. 20 shows a toe element 830 with a triangular baseplate 850 and a trihedral pointed nose 852.

FIG. 21 shows a toe element 930 which is a modified variant of the toe element 230 from FIGS. 7 and 8. The modification consists in the fact that the toe element 930 is provided with a flat supporting surface 938, the surface of which is identical to the horizontal cross section through the supporting element 930. Partly as a result of this, the tilting points 939 are at the outer boundary around the toe element 930. Furthermore, the toe element 930 is provided with a nose 952.

FIG. 22 shows a simple embodiment of a toe element 1030, which simply comprises a convex base element 1050 with a flat supporting surface 1038. A centre of gravity 1032 is located below half the height of the toe element 1030. The tilting points 1139 are also located well towards the outside. The circular boundary of the supporting surface 1038 is to be considered as a succession of tilting points 1039 which are located at a maximum horizontal distance from the centre of gravity 1032.

FIG. 23 shows an alternative, simple toe element 1130 which simply comprises a pyramidal body 1150. The underside of the pyramidal base element 1150 defines a supporting surface 1138. By virtue of the pyramid shape, the centre of gravity 1132 is lower than half the height of the toe element 1130.

Figure 24:
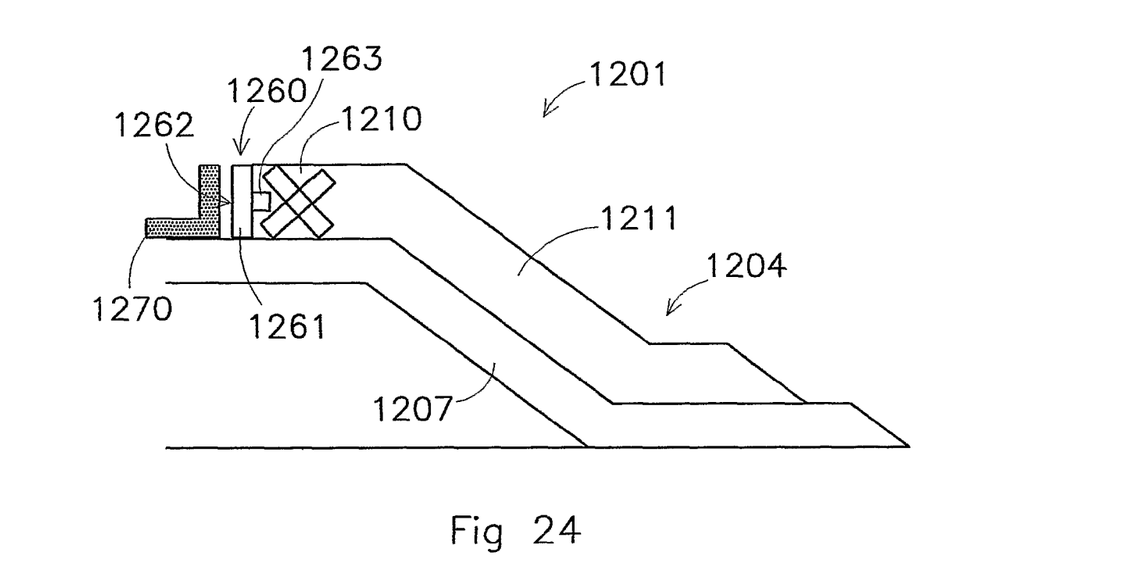
FIG. 24 shows a wave protection structure with a crown element.

FIG. 24 diagrammatically depicts a side view of a wave protection structure 1201 with a filter layer 1207 and a layer 1211 of wave protection elements 1210. An upper wave protection element 1210 is shown, whereas the other wave protection elements have been omitted for the sake of clarity. Toe elements according to the invention may be provided along a toe 1204, but the toe may also be formed in a conventional way. The use of a crown element 1260 is advantageous with respect to the prior art of the wave protection structure 1201. The crown element 1260 comprises a base 1261 which is flat on one side with a supporting surface 1262. Furthermore, the crown element 1260 may be provided with one or more projections 1263 for interacting with the wave protection element 1210. The supporting surface 1260 can interact with a crown structure 1270, in the example shown formed by L-shaped concrete sections.

Both the wave protection elements described above and the toe elements and crown elements can advantageously be made from concrete. It is also possible to use other materials as setting materials, including bituminous fillers and plastics. It is preferable for the toe elements and/or crown elements not to be steel-reinforced, in order to prevent concrete decay in an aggressive sea environment. The toe elements and/or crown elements are preferably formed in a mould. In an advantageous embodiment, this is the same mould or a modified mould as that used for the wave protection elements of the same wave protection structure, as described above. However, it is also possible to use a mould which differs from that of the wave protection elements.

Advantageously, all the toe elements in one wave protection structure are of substantially the same shape and dimensions. In the exemplary embodiments shown, a single row of toe elements extends along the toe of the wave protection structure. All the wave protection elements in one wave protection structure advantageously have substantially the same shape and dimensions, as shown in the exemplary embodiments.

What is claimed is:

1. Wave protection structure for a slope, which slope merges into a bed at the location of a toe, which wave protection structure comprises a plurality of wave protection elements and a plurality of toe elements, wherein the wave protection elements are each provided with a plurality of projections, which plurality of projections together form a three-dimensional structure for the wave protection elements to engage in one another in such a manner that the freedom of movement of the wave protection elements is limited in three dimensions, and the wave protection elements on the slope are provided in a substantially regular imaginary grid, with a horizontal grid spacing between the centres of gravity of the wave protection elements, while the toe elements extend in a longitudinal direction of the toe in order to counteract displacement of the wave protection elements from the slope to the bed, and are of a shape which deviates from the shape of the wave protection elements, where in the centres of gravity of the toe elements, in the longitudinal direction of the toe, are provided at substantially the same horizontal grid spacing from one another as the wave protection elements, and the shape of at least one of the toe elements is substantially identical to the shape of the wave protection element from which at least one projection has been omitted in order to form a supporting surface for the toe element.

2. Wave protection structure according to claim 1, wherein an angle of tilt of at least one of the toe elements is greater than an angle of tilt of the wave protection element, the angle of tilt for each of the elements being defined by the angle between the direction of the force of gravity and an imaginary line from the centre of gravity to a tilting point of the element in question.

3. Wave protection structure according to claim 1, in which a restoring moment of at least one of the toe elements, which is exerted by the weight of this toe element with respect to a tilting point if this toe element is subjected to a tilting moment, is greater than a restoring moment of a wave protection element if it were to be subjected to the same tilting moment at a comparable position along the toe.

4. Wave protection structure according to claim 1, wherein the centre of gravity of at least one of the toe elements is lower than half the height of the toe element in question.

5. Wave protection structure according to claim 1, in which at least one of the toe elements is provided with a supporting surface, by way of which it rests on the bed.

6. Wave protection structure according to claim 5, in which the supporting surface is provided with friction-increasing means.

7. Wave protection structure according to claim 1, which also comprises crown elements, the shape of at least one of the crown elements being substantially identical to the shape of the wave protection element from which at least one projection has been omitted.

8. Method for producing a wave protection structure, comprising the following steps:
- placing toe elements along a toe of a slope, with the centres of gravity at a horizontal grid spacing,
- placing a first row of wave protection elements at a substantially identical horizontal grid spacing, the first row of wave protection elements being placed against the slope and against the toe elements, wherein
- the wave protection elements are each provided with a plurality of projections, which plurality of projections together form a three-dimensional structure for the wave protection elements to engage in one another in such a manner that the freedom of movement of the wave protection elements is limited in three dimensions, and
- the shape of at least one of the toe elements is substantially identical to the shape of the wave protection element from which at least one projection has been omitted in order to form a supporting surface for the toe element.

* * * * *